United States Patent [19]

Lerner

[11] 3,876,939

[45] Apr. 8, 1975

[54] NARROW BAND FM SYSTEM FOR VOICE COMMUNICATIONS

[75] Inventor: Theodore Lerner, Williamsville, N.Y.

[73] Assignee: Textron Inc., Providence, R.I.

[22] Filed: Dec. 26, 1973

[21] Appl. No.: 427,658

Related U.S. Application Data

[63] Continuation of Ser. No. 219,245, Jan. 20, 1972, abandoned.

[52] U.S. Cl. .................... 325/46; 325/63; 325/346; 325/427

[51] Int. Cl. .................... H04b 1/62

[58] Field of Search ............. 325/17, 26, 45, 46, 63, 325/344, 347, 349, 351, 416–423, 424, 427, 490, 346; 333/17, 32

[56] References Cited

UNITED STATES PATENTS

| | | | |
|---|---|---|---|
| 2,397,157 | 3/1946 | Roberts | 325/46 |
| 2,488,612 | 11/1949 | Tunick | 325/344 |
| 3,084,327 | 4/1963 | Cutler | 325/46;46 X |
| 3,109,991 | 11/1963 | Ocko | 325/46 |
| 3,111,625 | 11/1963 | Crafts | 325/423 |
| 3,195,059 | 7/1965 | Adams | 325/46;46 X |
| 3,231,822 | 1/1966 | Tillotson | 325/427 |
| 3,787,775 | 1/1974 | Lanning | 325/419 X |
| 3,792,357 | 2/1974 | Hekimian et al. | 325/46 |

OTHER PUBLICATIONS

Viterbi, A., Coherent Communication, Library of Congress Card No. 66–22299, Copyright 1966.

*Primary Examiner*—Robert L. Griffin
*Assistant Examiner*—Aristotelis M. Psitos
*Attorney, Agent, or Firm*—Bean & Bean

[57] ABSTRACT

A narrow band FM system for voice communications demodulates the incoming frequency modulated carrier signal in such fashion that the bandwidth of the demodulating loop decreases as a function of a carrier signal strength. Preceding the demodulator loop is a limiter device which provides a constant power output so that as the signal-to-noise ratio decreases, the carrier signal power output likewise decreases and extends the threshold of the demodulator circuit. The demodulated output signal is modified as to its frequency spectrum to flatten the frequency spectrum of the noise signal output. In the transmitter, the voice signals are modified by a preemphasis circuit which tends to flatten the frequency spectrum of the voice signal prior to modulation and the deemphasis of modifying circuit in the receiver following the demodulator to flatten the frequency spectrum of the noise signal output substantially restores the frequency spectrum of the voice signal. The demodulator is a phase lock loop of linear negative feedback from including a multiplying circuit having the incoming signal and the demodulating signal as inputs thereto and supplying the input to the loop filter amplifier. The dc open loop gain and the transfer function of the loop filter amplifier are chosen to provide the proper frequency response for the loop and to provide an error response below a predetermined frequency which allows a reasonable modulation indice for the frequencies of interest.

6 Claims, 12 Drawing Figures

NARROW BAND FM SYSTEM FOR VOICE COMMUNICATIONS

CROSS REFERENCE TO RELATED APPLICATION

This application is a continuation of application Ser. No. 219,245, filed Jan. 20, 1972 and now abandoned.

The invention described herein was made in the performance of work under a NASA contract and is subject to the provisions of Section 305 of the National Aeronautics and Space Act of 1958, Public Law 85-568 (72 Stat. 435; U.S.C. 2457).

BACKGROUND OF THE INVENTION

Ordinarily, FM receivers utilize an automatic gain control on the incoming signal in order to avoid a decrease in bandwidth as the strength of the incoming carrier signal decreases. Such receivers display thresholds as the carrier-to-noise signal ratio decreases which are relatively fixed.

BRIEF SUMMARY OF THE INVENTION

According to the present invention, the bandwidth of the demodulator circuit is purposely decreased with decreasing incoming signal strength so as to allow the demodulator to adapt itself to varying carrier-to-noise input conditions. At low carrier-to-noise ratios, the phase locked demodulator loop approaches a threshold where the loop loses lock, the threshold being dependent upon the band of the loop and the received carrier-to-noise signal ratio. Preceding the demodulator circuit there is a limiting circuit from which the total output power remains relatively constant over the full range of carrier-to-noise ratio inputs so that as the input noise power increases, the output signal power is suppressed. As a result, the threshold of the system is decreased to lower values than ordinarily would be the case so that the loop will not lose the lock until much lower values of carrier-to-noise signal ratio inputs.

Within the above framework, there is provided after the demodulator circuit, a deemphasis circuit which modifies the frequency distribution of the demodulated signal so as to flatten the frequency distribution of the demodulated noise signal. In the transmitter, prior to modulation, there is provided a preemphasis or modifying circuit which tends to flatten the frequency distribution of the voice signals and the aforesaid deemphasizing circuit in the receiver substantially restores the frequency spectrum of the demodulated voice signals.

BRIEF DESCRIPTION OF THE DRAWING FIGURES

FIG. 6b is a graph showing the frequency response of the circuit of FIG. 6a;

FIG. 8b is a graph showing the frequency response of the circuit of FIG. 8a;

DETAILED DESCRIPTION OF THE INVENTION

Figure 1:
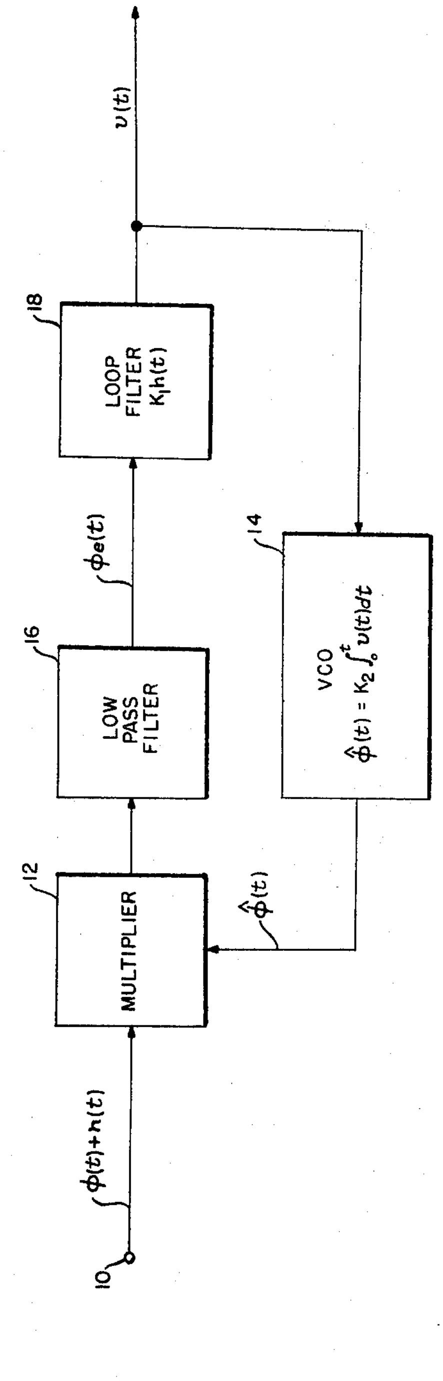
FIG. 1 is a diagrammatic view illustrating certain principles according to this invention.

Referring at this time more particularly to FIG. 1, certain basic principles of the phase locked demodulator loop according to the present invention will be seen. In FIG. 1, the input terminal 10 to the phase locked demodulator loop transmits the modulated carrier signal $\phi(t)$ plus the stationary gaussian noise signal $n(t)$ as one input to a multiplier circuit 12, the other input to which is the frequency modulated signal $\hat{\phi}(t)$ from the oscillator 14. The output of the multiplier circuit 14 is passed through a low pass filter 16 to remove high frequency components and the error signal $\hat{\phi}_e(t)$ is then applied to the loop filter network 18 whose output is the demodulated signal $v(t)$. The filtered output signal $v(t)$ controls the frequency of the circuit 14 and maintains the loop in phase lock.

The incoming signal is of the form:

$$\phi(t) = \sqrt{2}\, A \sin[\omega_o t + \phi(t)] \tag{1}$$

and the noise signal is of the form:

$$n(t) = \sqrt{2}[n_1(t)\sin\omega_o t + n_2(t)\cos\omega_o t\ t] \tag{2}$$

At the output of the low pass filter 16, the signal consists of two non-linear terms due to the sinusoidal transfer characteristic of the multiplier circuit 12 and is of the form:

$$\phi_e(t) = AB\sin[\phi(t) - \hat{\phi}(t)] - BN_e(t) \tag{3}$$

where:

$$BN_e(t) = -n_1(t)B\sin\hat{\phi}(t) = n_2(t)\cos\hat{\phi}(t) \tag{4}$$

It will be appreciated of course that the output signal $\phi(t)$ of the oscillator 14 is in the form:

$$\hat{\phi}(t) = \sqrt{2}B\cos[\omega_o t + \hat{\phi}(t)] \tag{5}$$

The frequency response of the demodulator loop is such that $\hat{\phi}(t) - \phi(t) << 1$ so that equation 3 above is in the form:

$$\phi_e(t) = AB[\phi(t) - \hat{\phi}(t)] + BN_e(t) \tag{6}$$

And, as indicated, the output of the oscillator 14 is of the form:

$$\hat{\phi}(t) = K_2 \int_0^t v(t)\,dt \tag{7}$$

Utilizing equation 6 above, the transfer function of the loop filter in the time domain is as follows:

$$v(t) = K_1 \int_0^t \{AB[\phi(t) - \hat{\phi}(t)] + BN_e(t)\}h(t-u)\,du \tag{8}$$

So long as equation 3 above may be reduced to the form of equation 6, the phase lock loop can be analyzed as a linear negative feedback control system and the response of the system in the frequency domain is determined by taking the Laplace transforms of equations 7 and 8 above, as follows:

$$\Phi(s) = K_2(V(s)/s) \quad (9)$$

$$V(s) = K_1ABH(s)[\Phi(s) - \hat{\Phi}(s)] = BK_1H(s)N_c(s) \quad (10)$$

which, by substitution and solving for $\Phi(s)$ $\hat{\Phi}(s)$ yields:

$$\Phi(s)-\hat{\Phi}(s)=\frac{1}{1+ABK_1K_2\frac{H(s)}{s}}\Phi(s) - \frac{ABK_1K_2\frac{H(s)}{s}}{1+ABK_1K_2\frac{H(s)}{s}}\frac{N_c(s)}{A} \quad (11)$$

It will be noted that in the right-hand term, the numerator and denominator have been multiplied by $A$ in order to provide the noise-to-signal term $[N_c(s)/A]$. From equation 11, it will be obvious that the error term is a function of the carrier phase deviation $\Phi(s)$ the received noise-to-carrier ratio $[N_c(s)/A]$ and the following two transfer functions:

$$\text{Closed loop error response}=\frac{1}{1+ABK_1K_2\frac{H(s)}{s}} \quad (12)$$

$$\text{Closed loop transfer function}=\frac{ABK_1K_2\frac{H(s)}{s}}{1+ABK_1K_2\frac{H(s)}{(s)}} \quad (13)$$

The common term $ABK_1\ K_2[H(s)/s]$ will be referred to as the Open loop transfer function of the phase locked loop and the open loop dc gain is $ABK_1K_2$.

By choosing the dc open loop gain sufficiently high and the transfer function of the loop filter so that the open loop response has a 0 db crossover at about 3KHZ and with a phase margin $\phi$m sufficiently high at the 0 db crossover and the closed loop error response such that the condition of equation 6 above holds, the demodulation loop will exhibit the required decrease in bandwidth as a function of the received carrier strength $a$.

For this purpose, the transfer function of the loop filter is of the general form:

$$H(s)=[(a_1+s)\ldots(a_n+s)]/[(b_1+s)\ldots(b_n+s)]$$

Figure 2:
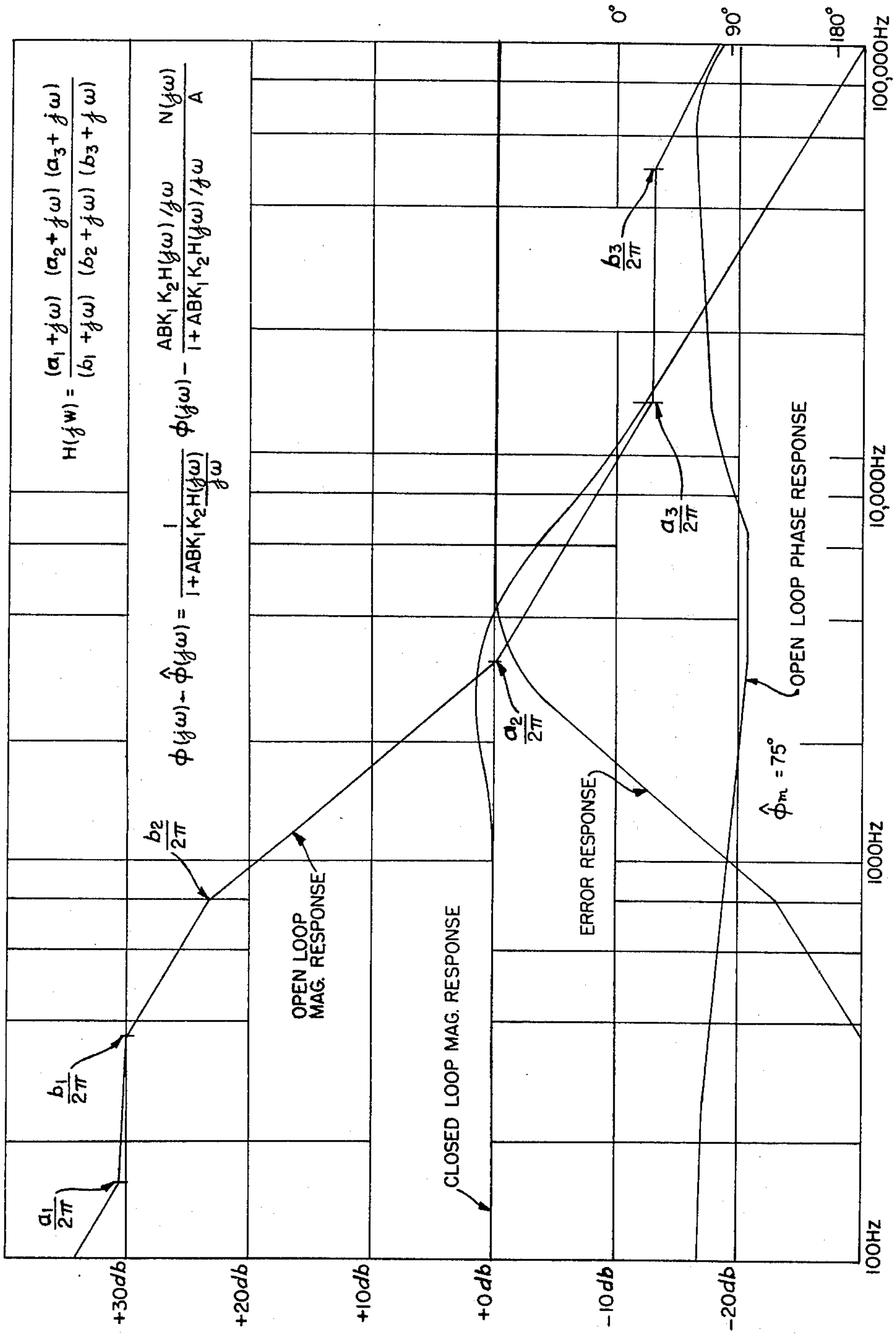
FIG. 2 is a graph illustrating certain characteristics of the phase lock loop of this invention.

In FIG. 2, this transfer function has been chosen such that the phase lead terms $a_1$ and $a_3$ were utilized at 106Hz and 13,000Hz to increase the phase margin to 75° at the 0 db crossover whereas the two lag terms $b_1$ and $b_2$ were utilized at 360Hz and 800 Hz to maintain the 0 db crossover point at 3,000Hz, an additional lag network being also utilized at 50,000Hz to decrease the open loop response at high frequencies. The overall effect of the compensation networks was to keep the open loop repsonse of the loop in the audiospectrum region while maintaining a low loop noise bandwith because of the reduced peaking of the closed loop response. The calculated loop noise bandwith for the configuration of FIG. 2 is 5,800Hz.

As noted in equation 11, the loop filter transfer function and the dc open loop gain determine the open loop 0 db crossover point and the subsequent closed loop bandwidth. The bandwidth of the phase locked loop therefore decreases as a function of the received carrier strength $A$ which is the first term in the expression for the dc open loop gain. The particular advantage of this variation in bandwidth with carrier strength is that the phase locked loop will adapt itself to varying carrier-to-noise input conditions. At low carrier-to-noise ratios the phase locked loop approaches a threshold where the loop loses lock, this threshold being dependent upon the bandwidth of the loop and the received carrier-to-noise ratio. By reducing the bandwidth with decreasing carrier-to-noise ratio, it is possible to extend the threshold of the loop and thus obtain the adaptive characteristic mentioned, such adaptive bandwidth characteristic being dependent on a decrease in signal strength as the carrier-to-noise ratio decreases.

Two methods are available to implement a decrease in carrier power with decreasing carrier-to-noise ratio, the first of which signal suppression means is a noise operated AGC and the second of which signal suppression means is a bandpass limiter. In both methods of approach, a decrease in signal carrier strength is obtained as the carrier-to-noise ratio decreases.

A bandpass limiter is preferred in that it offers superior performance characteristics as compared with a noise operated AGC. The bandpass limiter as disclosed in the *Journal of Applied Physics*, vol. 24, no. 6, pp. 720–727, June, 1953 has the characteristic that the total output power remains relatively constant over the full range of carrier-to-noise ratio input so that to accommodate for increases in input noise power and at the same time keep the output power constant, the limiter suppresses the output signal power. In consequence, a decrease in carrier power at the limiter output with decreasing input signal-to-noise ratios results. The performance of a limiter of this type is such that a high signal-to-noise ratios there is a 3 db improvement in SNR while at very low signal-to-noise ratios the SNR is degraded only 1.06db.

Figure 3:
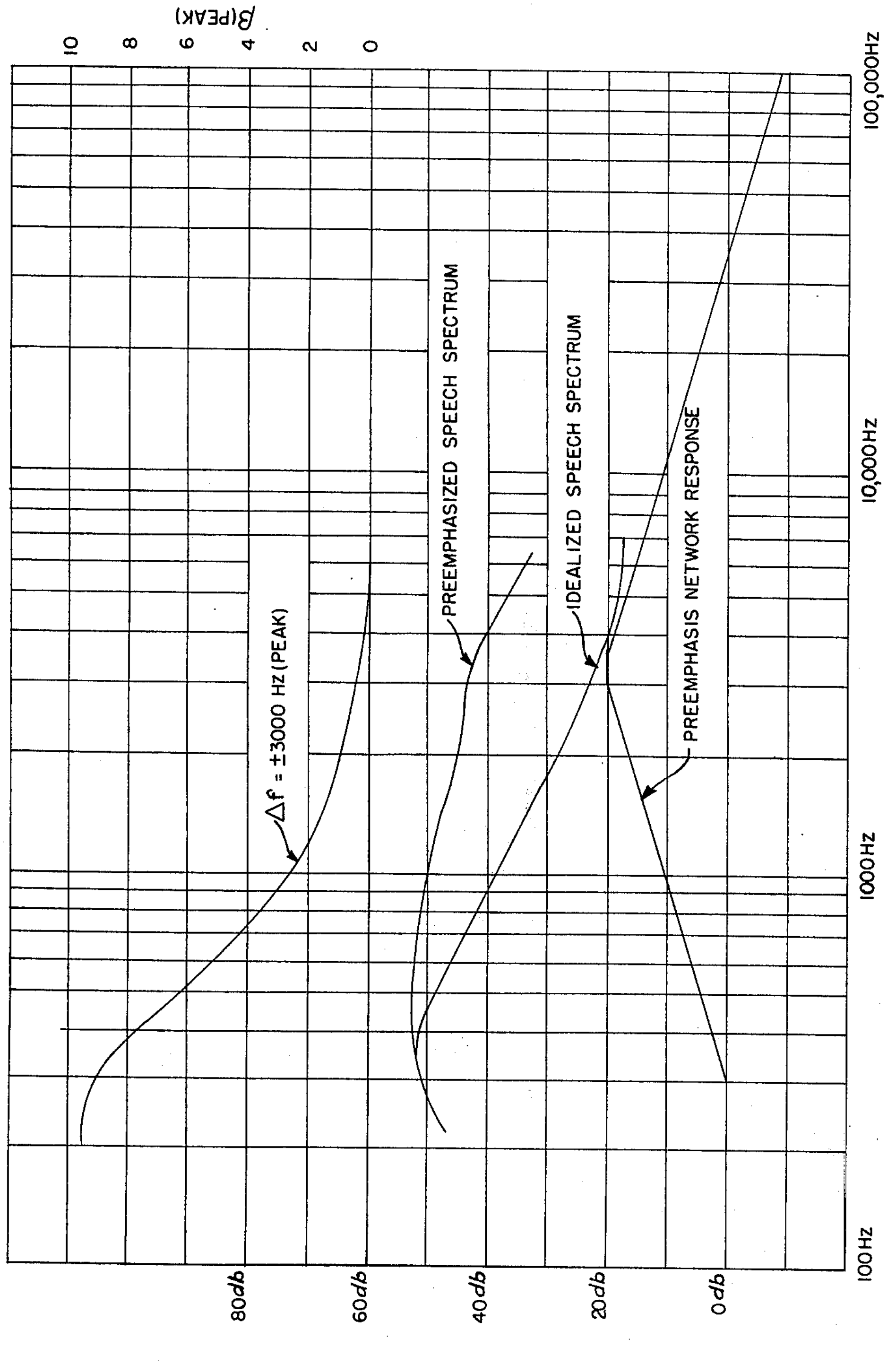
FIG. 3 is a graph illustrating the human voice spectrum and certain features of this invention.

The frequency response shown in FIG. 2 was designed in conjunction with the idealized speech spectrum of a male voice as shown in FIG. 3 with, as hereinafter described, preemphasis in the transmitter to flatten the idealized speech spectrum as indicated in FIG. 3. If at the modulator the peak frequency deviation is ± 3KHZ at the 440Hz peak of the preemphasized voice spectrum, the graph of relative modulation index versus frequency is as illustrated in FIG. 3. It is evident that there is no need for an increase in open loop gain below 300Hz or above 3,000Hz since the voice signal power is low outside this range.

In order to restore the demodulated voice signal substantially to the original frequency spectrum, a deemphasis network is provided after the demodulator and, for this purpose, it is preferred to utilize a deemphasis network which substantially flattens the frequency spectrum of the noise signal which tends otherwise to increase linearly with frequency so that the deemphasis network not only restores the original voice signal frequency spectrum, but suppresses the noise signal.

Figure 4:
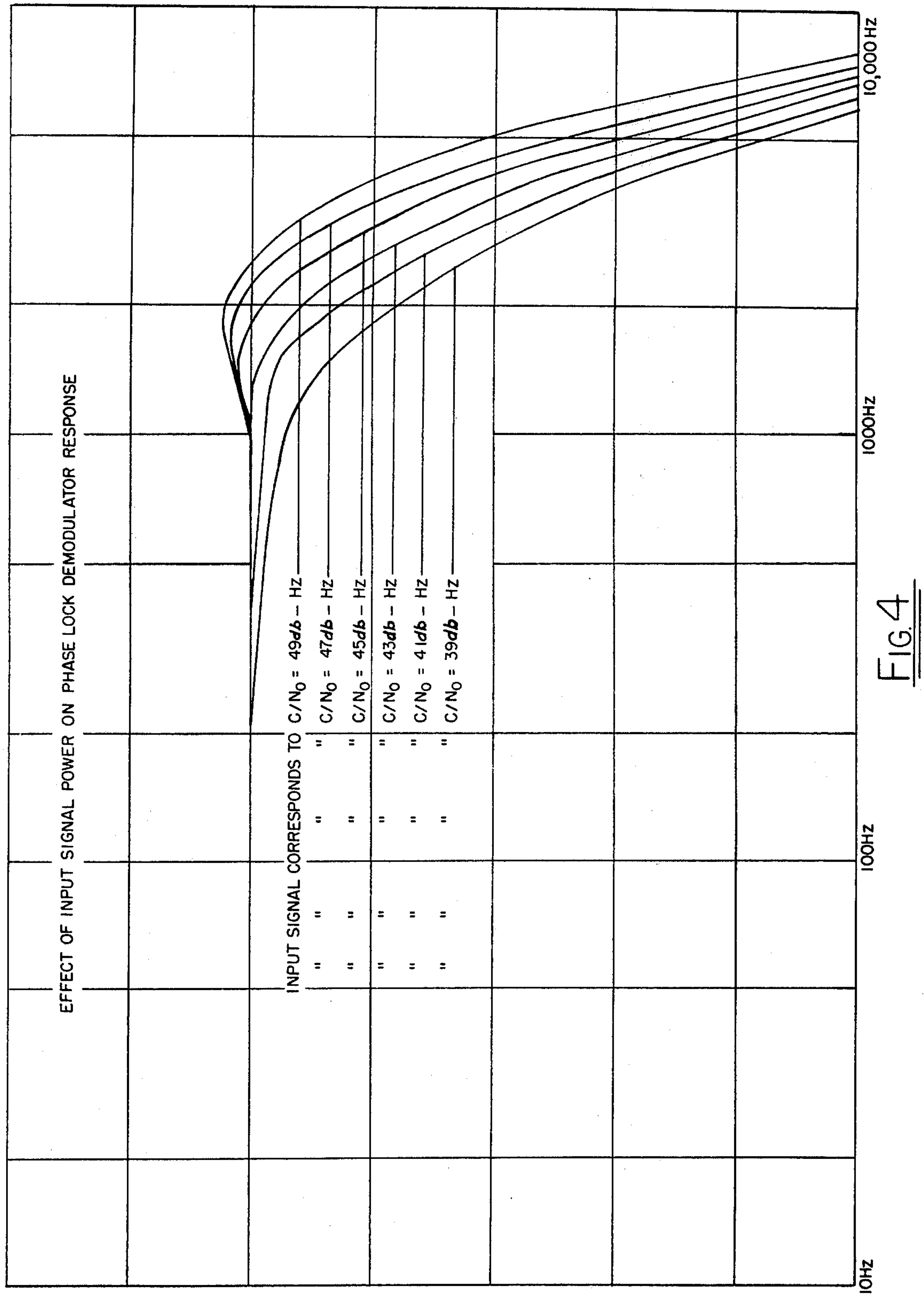
FIG. 4 is a graph illustrating the closed loop response of the phase locked loop of this invention at various carrier-to-noise ratios.

Utilizing the preemphasis and deemphasis techniques as described generally above and as are hereinafter specifically disclosed, the closed loop response of the phase locked loop at various carrier-to-noise spectral densities as shown in FIG. 4.

In addition to the above, a clipping network is used in the transmitter between the preemphasis circuit and the modulator. The clipping network performs the function of limiting the peak frequency deviation at the modulator output so that such deviation may not exceed a maximum value, thus assuring that the FM signal will not deviate beyond the tracking limits of the phase locked loop demodulator. The peak frequency deviation so obtained is held to a value which the phase locked loop can demodulate intelligibly at the lowest useful carrier-to-noise ratio.

Figure 5:
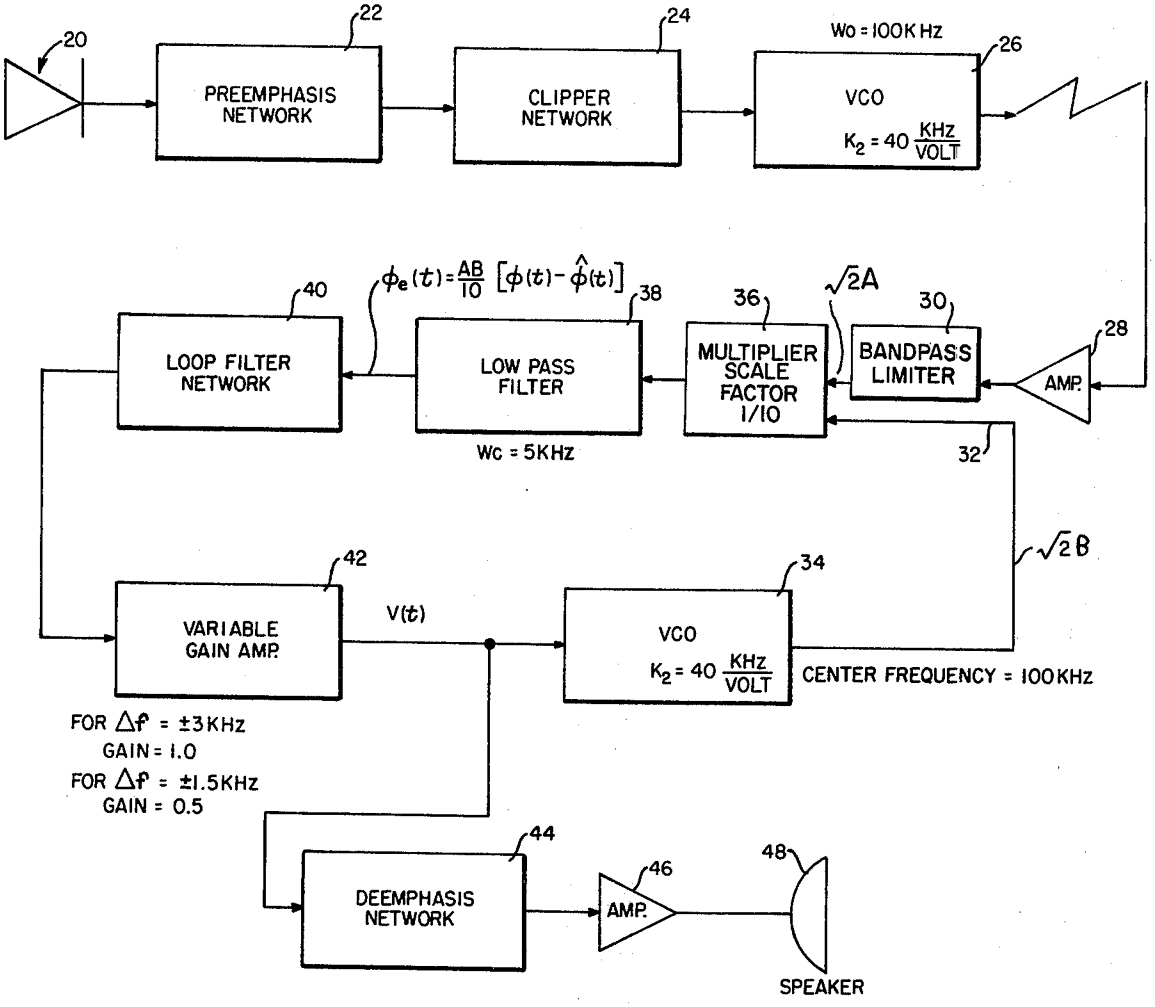
FIG. 5 is a diagram illustrating a preferred embodiment of the invention.
Figure 7:
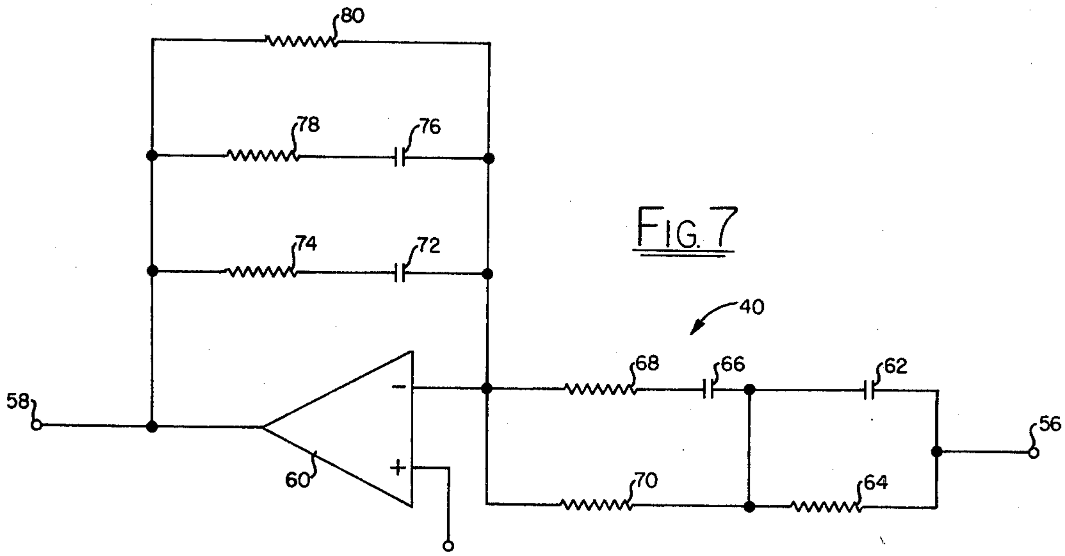
FIG. 7 is a circuit diagram of the loop filter of the preferred embodiment.

A preferred embodiment of the invention is illustrated in FIG. 5 and certain of the components and their characteristics are detailed in FIGS. 6–9. The system as shown in FIG. 5 includes an input transducer in the form of the microphone 20 connected to the preemphasis network 22 shown in detail in FIG. 6*a*. As reference to FIG. 6*a* will reveal, the input terminal 50 of the preemphasis network 22 is coupled through the series capacitance-resistance 56,58 and the resistance 60 in parallel therewith to the operational amplifier 54 and feedback is provided through the medium of the feedback resistance 62. As stated above, the preemphasis network 22 modifies the incoming voice signal to flatten the frequency distribution thereof to obtain the requisite output at the terminal 52.

Figure 6A:
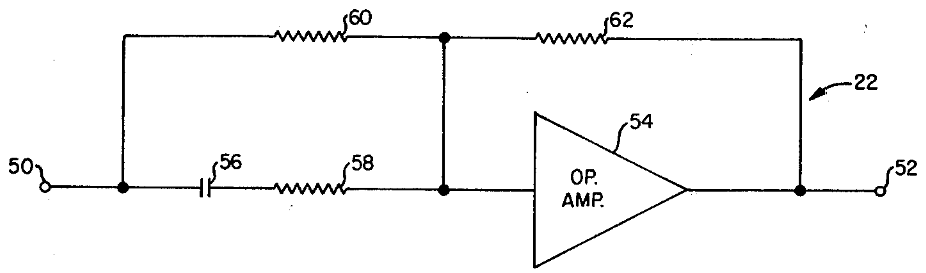
FIG. 6a is a circuit diagram of the preemphasis network.
Figure 6B:
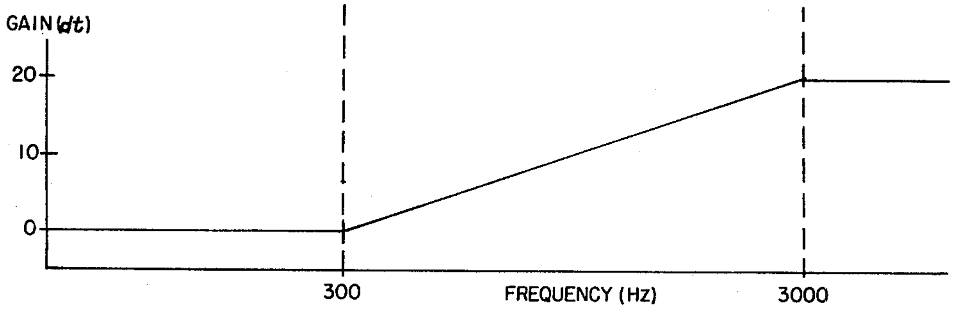

FIG. 6*b* shows the frequency response for the preemphasis network obtained by the capacitor 56 and resistors 58,60 and 62. Specifically, the frequency response is flat and provides zero db gain below 300Hz, is flat above 3,000Hz and provides a 20 db per octave characteristic between these limits, as shown.

Figure 9:
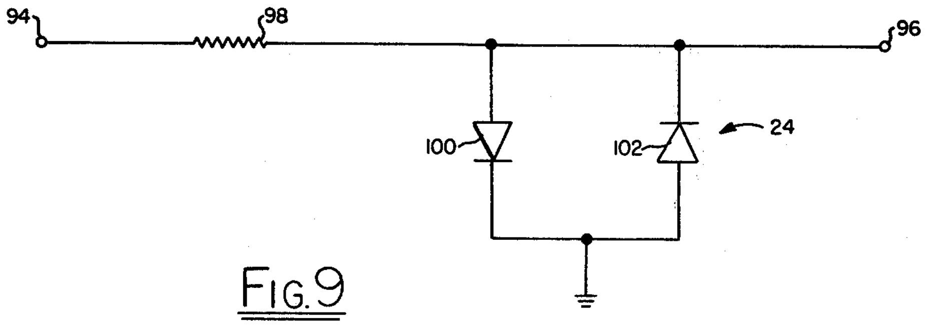
FIG. 9 is a circuit diagram of the clipper network.
Figure 8A:
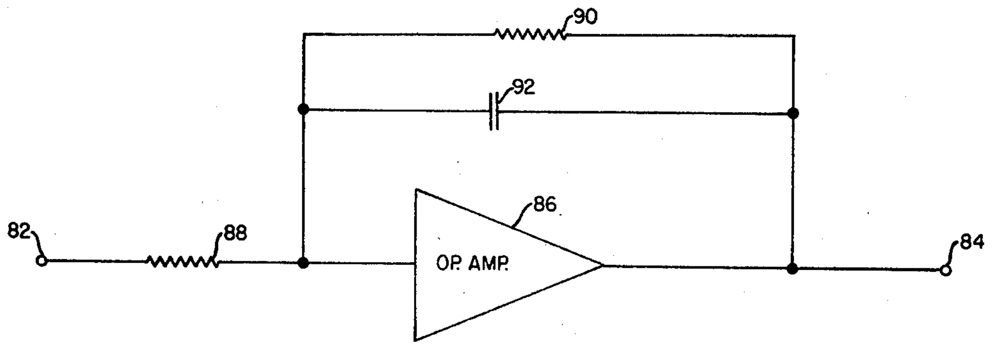
FIG. 8a is a circuit diagram of the deemphasis network.
Figure 8B:
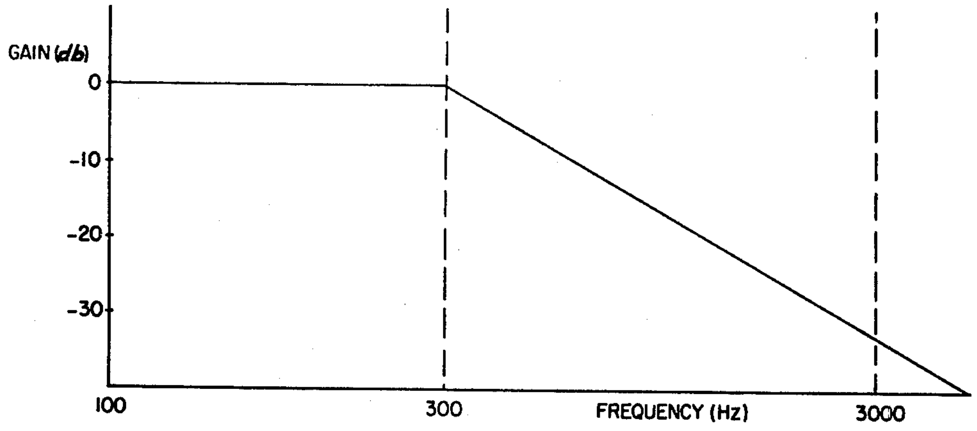

Returning to FIG. 5, the modified voice signal obtained from the preemphasis network is applied to the clipper network 24 which is shown in FIG. 9. This network simply takes the form of a resistor 98 connected between the input and output terminals 94 and 96, in combination with the oppositely poled diode pair 100,102 connected to ground potential. The input voltage level is set so that the clipping level is approximately 12 db below the peak voice signal and the output controls the frequency of the oscillator 26 having a center frequency of 100K Hz.

In the receiver portion of the system, the received signal is first amplified at 28 and is then applied to the multiplier circuit 36 corresponding to the multiplier 12 of FIG. 1. The 5K Hz low bandpass limited at 30 and pass filter 38 corresponds to the filter 16 of FIG. 1 and the loop filter network 40 is shown in detail in FIG. 7. Using the notations in which the various components associated with the operational amplifier 60 are such that capacitances 62, 66, 72 and 76 are designated $C_1$, $C_2$, $C_4$ and $C_5$ respectively and the resistors 64, 68, 70, 74, 78 and 80 are designated $R_1$, $R_2$, $R_3$, $R_4$, $R_5$ and $R_6$ respectively, the following parameters apply for the phase lock loop:

| Demodulator Signal and Component Values | Open Loop Transfer Function Parameters |
|---|---|
| $\sqrt{2}A = \sqrt{2}B = 5$ volts | Carrier and VCO signal levels |
| AB = 1.25 volts/radian | Multiplier Transfer Constant |
| $K_1 = R_6/R_1 + R_3 = 1.15$ | Loop Filter dc Gain |
| $K_2 = 2\pi \cdot 40 \cdot 10^3$ rad/sec/volt | VCO Transfer Constant |
| $ABK_1K_2 = 3.6 \times 10^5$ | dc Loop Gain = 111 db |

-Continued

| Demodulator Signal and Component Values | Open Loop Transfer Function Parameters |
|---|---|
| $b_1 \approx 1/2\pi\ C_5(R_5 + R_6)$ | $b_1 = 1.5$ Hz |
| $a_1 \approx 1/2\pi\ C_5R_5$ | $a_1 = 16$ Hz |
| $a_2 \approx 1/2\pi\ R_1C_1$ | $a_2 = 160$ Hz |
| $b_2 \approx 1/2\pi\ R_3C_1$ | $b_2 = 360$ Hz |
| $b_3 \approx 1/2\pi\ C_4(R_4 + R_5)$ | $b_3 = 800$ Hz |
| $a_3 \approx 1/2\pi\ C_4R_4$ | $a_3 = 3000$ Hz |
| $a_4 \approx 1/2\pi\ C_2(R_2 + R_3)$ | $a_4 = 13,000$ Hz |
| $b_4 \approx 1/2\pi\ C_2R_2$ | $b_4 = 50,000$ |

Figure 10:
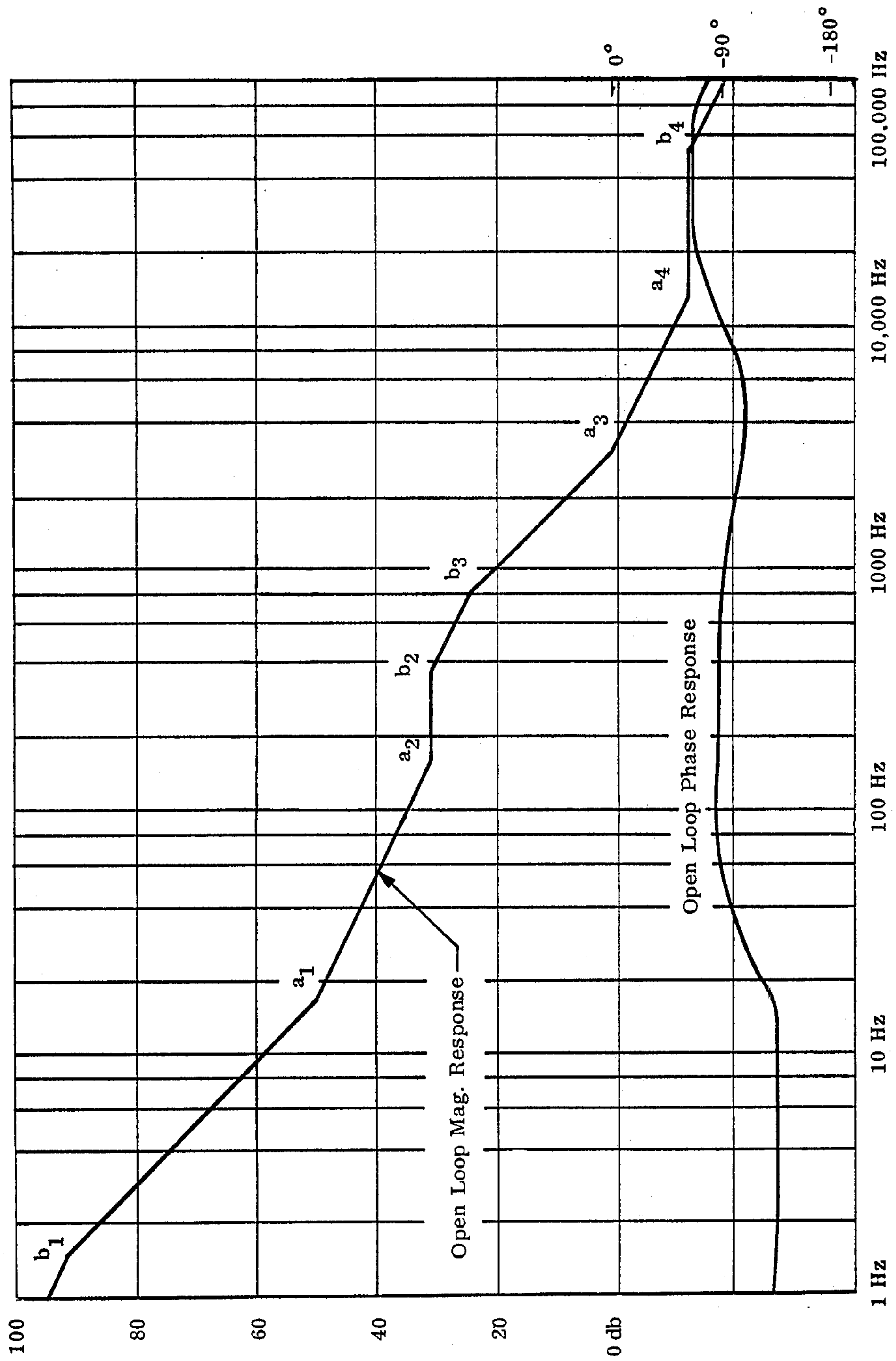
FIG. 10 is a graph showing characteristics of the preferred embodiment of FIG. 5.

The characteristics of the phase lock loop provided by the circuits 36, 38, 40, 42 and 34 of FIG. 5 are illustrated in FIG. 10.

The signal $V(t)$ is applied to the deemphasis network 44 after which the voice signal is applied to the amplifier 46 driving the speaker 48. The deemphasis network is shown in detail in FIG. 8*a* and has the response indicated in FIG. 8*b*. The input and output terminals of the deemphasis network are indicated at 82 and 84 and the network itself will be seen to include the input resistor 88 connected to the operational amplifier 86 provided with the feedback resistor 90 and the capacitor 92 in parallel therewith.

In practical application, the received carrier may vary over ±5 KHz due to doppler frequency shift along the aircraft to satellite link, and instabilities in the aircraft modulator VCO. At the ground station, the phase locked loop demodulator will not only have to track this range of carrier frequencies, but will also have to acquire the carrier upon reception of each voice transmission. For the phase locked loop to track large deviations in carrier frequency, and also keep the phase error at the multiplier to a minimum, a high open loop dc gain is required. The static phase error between the received carrier and demodulator VCO is given by $$\theta_5 = (\omega_o - \omega_{vco})/ABK_1K_2$$

where $\omega_o$ is the carrier frequency in radians per second, and $\omega_{vco}$ is the demodulator VCO frequency in radians per second. To maintain a static phase error of 5° over a carrier frequency range of ±5 KHz requires a dc open loop gain of $3.6 \times 10^5$ or 111 db. To introudce this dc gain in the open loop transfer function and at the same time maintain the open loop transfer characteristics of a modified second order loop, it was necessary to increase the loop gain by utilizing a lag-lead network at 1.5 Hz and 16 Hz, respectively. This lag-lead network along with an increase in dc gain, $K_1$, of the loop filter, provides the necessary increase in gain of the open loop transfer function.

Tests on the demodulator designed with the open loop transfer function in FIG. 10, showed no deterioration in performance over a range of $C/N_o$ ratios down to 45 db-Hz and a peak frequency deviation of ±3.0 KHz. At lower $C/N_o$ ratios and peak frequency deviations of ±1.5 KHz, it was necessary to decrease the closed loop bandwidth by decreasing the open loop gain by one-half. The static phase error for this case is 10° at $\omega_o - \omega_{vco}$ = 5.0KHz, and there was a noticeable deterioration in performance at a $C/N_o$ of 41 db-Hz. However, by modifying the lag and lead networks at $a_1$ and $b_1$ (FIG. 10), it was possible to reduce the phase error to the original 5°]and regain adequate loop performance.

In push-to-talk systems, the phase locked loop may have to acquire the voice carrier upon reception of each transmission from the aircraft. The time to acquire will have to be a minimum consistant with the time difference from when the push-to-talk button is pressed, to when the speaker first starts talking. The time to acquire lock for a phase lock is dependent on the initial conditions of carrier and VCO frequency differences. If the frequency difference falls with phase locked loop noise bandwidth, the time to acquire is a function of loop lock up time. For frequency differences outside the loop noise bandwidth, the time to acquire is a function of both the lock-up time and also the time required to pull the VCO and carrier frequency difference to within the loop noise bandwidth (pull-in-time).

The graphs of FIG. 4 illustrate the response of the phase lock modulator of FIG. 5 for various carrier-to-noise ratios.

What is claimed is:

1. A narrow band FM voice communication channel comprising, in combination:

transmitter means for transmitting voice signals as a frequency modulated carrier signal having a peak frequency deviation not exceeding about ±5K Hz, said transmitter means including preemphasis means for flattening the frequency spectrum of the voice signals so transmitted;

receiver means for receiving said frequency modulated carrier signal plus noise, said receiver means comprising demodulator means for linearly demodulating an incoming frequency modulated signal, said demodulator means comprising a phase locked loop including phase detector multiplier means having one input which is said incoming signal, a voltage controlled oscillator means providing a second input to said phase detector multiplier means, and lag-lead loop filter means controlling the output of said voltage controlled oscillator means from the output of said phase detector multiplier means, said loop filter means having a transfer function providing a selected value of loop noise bandwidth with respect to incoming signal strength which will permit threshold extension of the receiver; and signal suppression means preceeding said demodulator means, for decreasing the amplitude of said incoming signal as the incoming signal-to-noise ratio decreases whereby to extend the threshold of the receiver.

2. A narrow band FM voice communication channel comprising, in combination:

transmitter means including voice signal input means, preemphasis means for substantially flattening voice signal input over a selected range of audio frequencies, and modulator means for producing a signal output; and receiver means for receiving said signal output and providing an audio output over said selected range of audio frequencies, said receiver means including demodulator means, signal suppression means preceding said demodulator means for decreasing the amplitude of said received signal output as the signal-to-noise ratio thereof decreases, and deemphasis means following said demodulator means for substantially restoring the frequency spectrum of the voice signal input to said transmitter means said demodulator means comprising a phaselocked loop including phase detector multiplier means having one input from said signal suppression means, a voltage controlled oscillator means for providing a second input to said phase detector multiplier means, and laglead loop filter means for controlling the output of said oscillator means from the output of said phase detector multiplier means, said loop filter means including phase lag network means operative at a frequency below the lower limit of said selected range of audio frequencies for establishing a zero db crossover of the open loop gain of said phase-locked loop substantially at the upper end of said selected range of audio frequencies, phase lead network means operative at frequencies above and below said selected range of audio frequencies for establishing a sufficiently high open loop gain over said selected range of audio frequencies and to establish a phase margin of at least about 75° at said zero db crossover, whereby said demodulator means operates in conjunction with said signal suppression means to extend the threshold of said phase-locked loop.

3. A narrow band FM channel as defined in claim 2 wherein said signal suppression means is in the form of a bandpass limiter.

4. In a narrow band voice communication channel as defined in claim 2 wherein the output of said multiplier means is of the form:

$$\phi_e(t)=ABsin[\phi(t)-\phi(t)]+BN_e(t)$$

where $A$ is the incoming carrier signal strength, $B$ is the signal strength of said oscillator means, $\phi(t)$ is the phase modulation of the incoming signal, $\hat{\phi}(t)$ is the phase modulation of the output of said oscillator means, and $N_e(t)$ is noise; and where $\phi(t)-\hat{\phi}(t)$ is small such that $\sin[\phi(t)-\hat{\phi}(t)]$ is substantially equal to $\phi(t)-\hat{\phi}(t)$.

5. In a narrow band voice communication channel as defined in claim 4 wherein the transfer function of the loop filter means is of the form: $H(s) = [(a_1+s) \ldots (a_n+s)]/[(b_1+s) \ldots (b_n+s)]$.

6. In a narrow band voice communication channel as defined in claim 5 including clipper means for clipping the output of said preemphasis means.

* * * * *